(12) United States Patent
Jordan et al.

(10) Patent No.: US 6,892,950 B1
(45) Date of Patent: May 17, 2005

(54) TYPE PLATE COMPRISING A STORAGE DEVICE

(75) Inventors: Peter Jordan, deceased, late of Pfaffenhofen (DE); by Christina Jordan, legal representative, Pfaffenhofen (DE); Frank Meyer-Hessing, Hannover (DE); Jean Borun, Munich (DE); Jürgen Röming, Oberschleissheim (DE); Michael Steffen, Stockdorf (DE)

(73) Assignee: Wacker Construction Equipment AG, Munich (DE)

(*) Notice: Subject to any disclaimer, the term of this patent is extended or adjusted under 35 U.S.C. 154(b) by 0 days.

(21) Appl. No.: 10/019,889

(22) PCT Filed: Jun. 7, 2000

(86) PCT No.: PCT/EP00/05263

§ 371 (c)(1),
(2), (4) Date: Dec. 28, 2001

(87) PCT Pub. No.: WO01/03062

PCT Pub. Date: Jan. 11, 2001

(30) Foreign Application Priority Data

Jun. 29, 1999 (DE) .......................................... 199 29 766

(51) Int. Cl.⁷ .............................................. G06K 19/06
(52) U.S. Cl. ....................... 235/492; 235/375; 235/380; 235/441
(58) Field of Search .................................. 235/492, 375, 235/380, 441

(56) References Cited

U.S. PATENT DOCUMENTS

| | | | | |
|---|---|---|---|---|
| 5,929,414 A | * | 7/1999 | Saitoh | 235/380 |
| 5,988,510 A | * | 11/1999 | Tuttle et al. | 235/492 |
| 6,045,043 A | * | 4/2000 | Bashan et al. | 235/441 |
| 6,068,193 A | * | 5/2000 | Kreft | 235/492 |
| 6,105,874 A | * | 8/2000 | Berger et al. | 235/492 |
| 6,168,083 B1 | * | 1/2001 | Berger et al. | 235/492 |
| 6,364,207 B1 | * | 4/2002 | Thuringer et al. | 235/492 |
| 6,375,082 B1 | * | 4/2002 | Kobayashi et al. | 235/492 |

FOREIGN PATENT DOCUMENTS

| | | |
|---|---|---|
| EP | 0 534 559 | 3/1993 |
| EP | 0 754 406 | 1/1997 |
| FR | 2717593 | 9/1995 |

* cited by examiner

Primary Examiner—Karl D. Frech
Assistant Examiner—Seung H Lee
(74) Attorney, Agent, or Firm—Boyle Fredrickson Newholm Stein & Gratz, S.C.

(57) ABSTRACT

The invention relates to a type plate for machines which serves as a support for written and/or graphical information. The inventive type plate is provided with a storage device which is integrated therein and which is suited for inputting and outputting data.

16 Claims, 1 Drawing Sheet

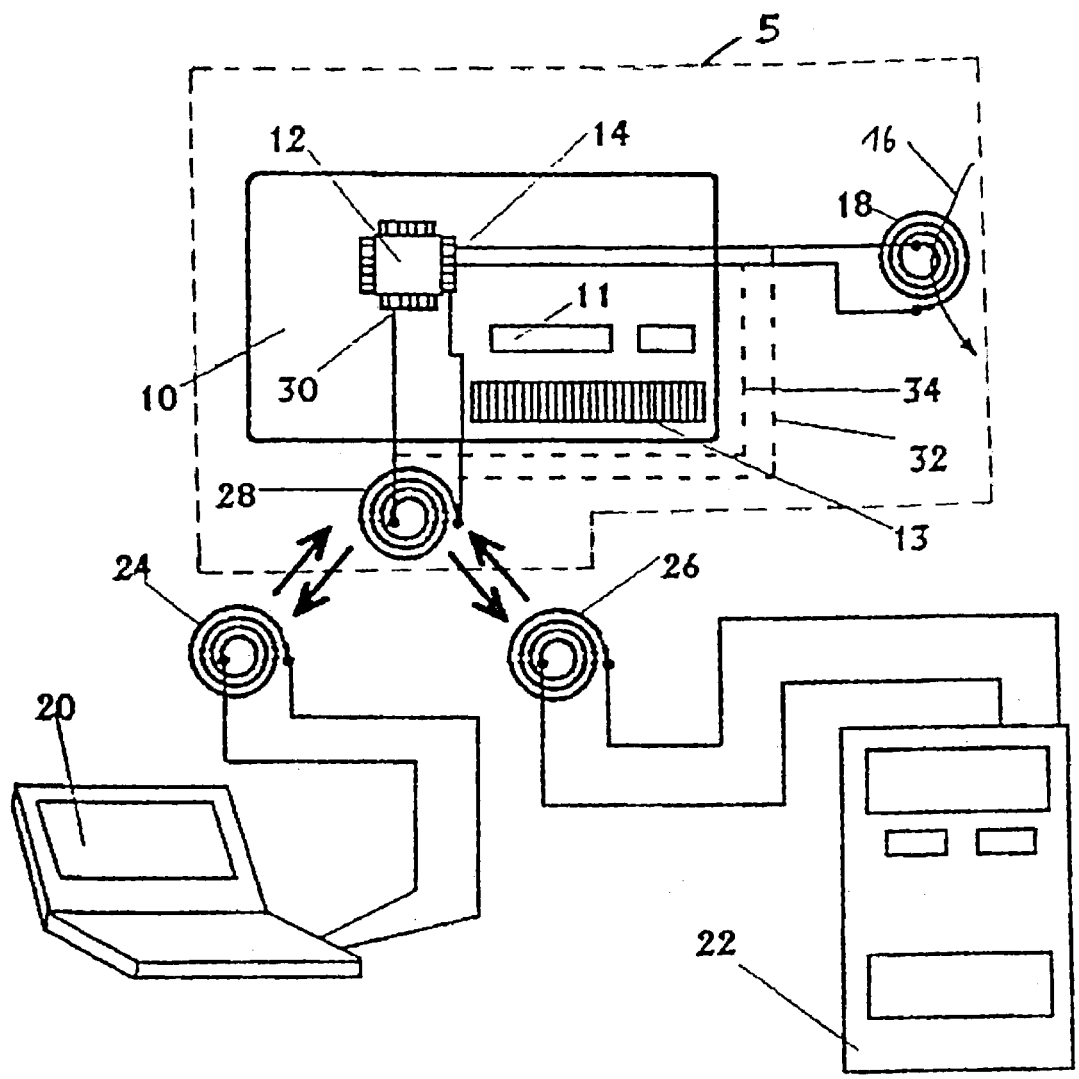

TYPE PLATE COMPRISING A STORAGE DEVICE

BACKGROUND OF THE INVENTION

1. Field of the Invention

The invention, according to the preamble of claim 1, relates to a machine having a type plate as a carrier for written and/or graphical information, which at the same time is combined with an electronic storage device.

2. Description of the Related Art

Machines are provided by the manufacturer with a permanently fixed type or rating plate, on which important information is noted, most often in addition to the designation of the manufacturer and, if appropriate, a type designation, amongst other information the date of manufacture, a machine number and relevant rating data, such as current consumption, output power or rotational speed. The data is most often applied to the type plate in an indestructible script, for example by embossing or engraving. A bar code for the non-contact registration of the data by means of laser scanners can also be provided.

It is also already known to provide machines with memories which, in the course of the use of the machine, store relevant operating or rating data, such as the running time, rotational speeds and loadings. These memories are connected mechanically to the power supply of the machine and, depending on the design configuration of the machine, are arranged at locations which respectively appear to be suitable.

The data contained in such memories supplements the information on the rating plates in an advantageous way, since the information on the rating plate describes the condition of the machine at the time of its fabrication, while the stored data is suitable for supplying information about the operation of the machines after its fabrication, such as the running time, rotational speeds and loading.

Starting from the idea that it is precisely this additional information which accumulates during the operating time of the machine which proves to be particularly useful when a relatively large pool of machines has to be looked after and maintained, including, for example, companies which lease or lend machines, it was perceived as disadvantageous that there is no standard rule as to where such memories have to be arranged on the machine and how the data is to be read in and out, so that in each case specific knowledge and, if appropriate, aids are required in order to gain access to the data.

EP-A-0 534 559 discloses a chip card having a storage device without its own power supply, which has a separate input for data transmission signals generated in an apparatus and an input/output for the non-contact output and input of data with devices, the storage device being suitable for receiving the operating power required to read into and out of the memory, as well as that required for storage, without mechanical coupling, in a non-contacting manner, from the devices during operation.

Furthermore, EP-A-0 754 406 discloses a transponder earmark for the electronic identification of animals, and FR-A-2 717 593 discloses a plate to be fitted to containers for both the visual and the electronic identification of containers, for example with regard to their content, their origin or their intended location.

OBJECTS AND SUMMARY OF THE INVENTION

The invention is based on the object of providing a relatively simple means to make it possible to configure machines which are provided with a device for the registration, storage and output of machine-based data in such a way that the operation of reading out and, if appropriate, the operation of reading in is made significantly easier and can be carried out without specific, machine-based knowledge.

This object is achieved as specified in patent claim 1. According to this, the invention is characterized in that the storage device has a separate input for data transmission signals generated in the machine and an output and, if appropriate, a second input for the non-contact or wire-free output and, if appropriate, input of data.

Therefore, according to the invention, a type plate is connected functionally to a machine in such a way that data generated by the machine itself can be transmitted to the memory chip of the type plate during operation, from which it can be read out easily by using standardized means.

The flat, thin type plate of relatively small size can easily be fitted at a location suitable for it to be read, and is generally also located at such a place, for which reason it is no trouble to use the memory chip and at any time to obtain information, for example about the condition of the machine or its incorporation into an operational organizational structure, such as information about the operating time, the loading or the rotational speeds and/or compliance with maintenance intervals, or else the assignment of the machine to a specific operating area or site. This may be of particular importance to companies which lend or lease machines, it being possible for the reliability of the information to be ensured by means of suitable measures, known per se, for restricting access to the stored data.

The memory chip is preferably connected in such a way that it does not have its own power supply or energy store, instead that the memory chip is suitable for receiving the power required to read into and out of the memory appliances which are separate from the type plate. Such appliances can be transponders or other magnetic data transmission devices, which preferably operate in a non-contact or wire-free manner, in order to be able to encapsulate the transmitter or receiver completely with respect to the environment. The transmitters or receivers then have no contacts or lines leading to the outside, which is advantageous in particular when the machines are used in a rough environment, for example on building sites.

According to a particularly expedient refinement, the memory chip is suitable for receiving the operating power from the appliances for reading data into and/or out of the memory chip during their operation.

Depending on the request or requirement or depending on the equipment of the machine provided with the type plate, data can if necessary be input only from outside the machine by means of a suitable input appliance, or data can also be obtained within the machine by means of suitable signal transmitters and transmitted to the memory chip, for which purpose a transmitter for the power and data transmission can be arranged within the machine in a suitable physical associate with the type plate.

A further advantageous embodiment consists in the memory chip having a separate input for data transmission signals generated in the machine and a second output and, if appropriate, input for the non-contact or wire-free output and, if appropriate, input of data.

The subject of the invention is also a machine comprising a type plate according to the invention, in which the type plate within the machine is assigned a transmitter for data and operating power in a physical position permitting the transmission of said power to the storage device.

BRIEF DESCRIPTION OF THE PREFERRED EMBODIMENTS

The invention will be explained in more detail using an exemplary embodiment thereof illustrated in the drawing.

The drawing shows in schematic form a type plate designed in accordance with the invention and its incorporation into a system or data input and output devices.

DETAILED DESCRIPTION OF THE PREFERRED EMBODIMENTS

The type plate of the conventional type, often also referred to as a rating plate, is identified by 10 and has various areas 11 for the inscription, using the embossing or engraving process, for example, it also being possible for a bar code 13 to be applied. Integrated into this type plate is an electronic memory chip 12 which serves as a storage device, does not have its own power supply and is suitable for storing data. In order to input or output the data, devices or appliances are necessary which are suitable for supplying the necessary power to the memory chip 12 when they are being used.

In the example shown, the machine 5 which bears the rating plate, but is itself not shown, is provided with signal transmitters which are suitable for converting relevant operating data into signals which can be transmitted to a data input 14 of the memory chip 12. For this purpose, the signals, represented symbolically by 16, are transmitted to a receiver 18 which is connected to the data input 14 which at the same time serves to supply power to the memory chip 12 during the transmission of data out of the machine 5. If appropriate, the receiver 18 for non-contact data and power transmission can also be replaced by a permanent line connection, that is to say by fixed wiring.

In order to read out the data stored in the memory chip 12, but also to read in data which cannot be obtained within the machine 5 and have to be supplied from outside, for example data about the place of use of the machine 5 or an existing rental agreement, or in order to read in all the data to be stored if the machine 5 is not provided with a signal generator or the like, compatible appliances can be used, for example in the form of a laptop 20 or an operating hours counter 22, each being provided with a transmitter/receiver 24 or 26, which is suitable for transmitting data and operating power in a non-contact manner to a transmitter/receiver 28 connected to a second data input and output 30 on the memory chip.

The memory chip 12 can be connected in such a way that the arbitrary input of data via the transmitter/receiver 28 is possible only when a predefined condition is satisfied, for example as the result of the input of a security code, in order to prevent data manipulation by unauthorized persons. Equally, interrogation authorization can also be provided.

As the line connections 32 and 34 symbolize, there may also be a connection between the data input 14 and the transmitter/receiver 28.

What is claimed is:

1. A machine having a type plate affixed thereto, the type plate forms a carrier for at least one of written and graphical information, the type plate bearing an electronic storage device, wherein the storage device has a separate input for receiving data transmission signals that are generated in the machine and that are representative of operational data of the machine, and wherein the storage device has a second input and an output which provide wire-free transmission of data to a device provided separately from the type plate.

2. The machine as claimed in claim 1, wherein the storage device lacks its own power supply.

3. The machine as claimed in claim 2, wherein the storage device is suitable for receiving operating power required to read data into and out of a memory, as well as the wire-free transmission of electrical power to the second input of the storage device from a device provided separately from the type plate.

4. The machine as claimed in claim 3, wherein the storage device receives operating power, without a mechanical coupling, in a con-contact or wire-free manner.

5. The machine as claimed in claim 3, wherein the storage device receives operating power from at least one of the second inputs, the operating power being provided separately from the reading of data into and/or out of the storage device.

6. The machine as claimed in claim 2, wherein the machine includes a second transmitter, and the type plate is physically positioned within the machine, thereby permitting the transmission of data and operating power from the second transmitter to the storage device.

7. The machine as claimed in claim 1, further comprising a connection between the separate input and a transmitter/receiver of the output and between the separate input and the second input.

8. The machine as claimed in claim 1, wherein the data signals generated in the machine includes information indicative of at least one of an operating time of the machine, a loading of the machine, and a rotational speed of the machine.

9. In combination:

a machine having an output; and an apparatus configured to monitor operation of the machine, the apparatus including a wireless transmitter disposed on the machine, the wireless transmitter configured to transmit a first signal representative of operating data of the machine;

a type plate affixed to the machine, the type plate lacking its own power supply and having a first input configured to receive the first signal from the wireless transmitter of the machine, a second input configured to receive a second signal from a device that is separate from the type plate, an electronic storage device configured to store the operating data represented by the first signal, and an output configured to provide wire-free transmission of the operating data to the device that is separate from the type plate.

10. The combination as claimed in claim 9, wherein the first input is linked to a wireless receiver, and the first signal provides electrical power to the electronic storage device.

11. The combination as claimed in claim 9, wherein the type plate further includes a wireless receiver connected to the second input, and wherein the second input signal serves to provide operational power to the electronic storage device during the transmission of the first signal from the wireless transmitter of the machine to the first input.

12. The combination as claimed in claim 11, wherein the type plate is configured such that transmission of the operating data from the wireless transmitter to the first input is possible only as a result of an input of a security code.

13. The combination as claimed in claim 9, wherein the operating data is indicative of at least one of an operating speed and an operating time period of the machine.

14. A method of monitoring operation of a machine, the method comprising the steps of:

affixing a type plate to the machine, the type plate having an electronic storage device having a first input, a second input, an output, and a wireless receiver connected to the second input;

acquiring operating data concerning the machine, the operating data including data indicative of at least one of an operating time of the machine and an operating speed of an output of the machine;

transmitting a first signal representing the operating data from a transmitter of the machine to the first input of the storage device;

transmitting a second signal from a device that is separate from the type plate to the wireless receiver on the type plate; and storing the operating data in the electronic storage device of the type plate.

15. The method as claimed in claim 14, further comprising using electrical power from the second signal to provide operational power to the electronic storage device.

16. The method as claimed in claim 14, wherein the step of storing the operating data is performed only in response to the inputting of a security code.

* * * * *